US012052296B2

(12) United States Patent
Lutton

(10) Patent No.: US 12,052,296 B2
(45) Date of Patent: Jul. 30, 2024

(54) METHODS AND SYSTEMS FOR MAINTAINING CONDITIONAL COMMUNICATION SESSIONS USING TERMINABLE AUTHENTICATION SIGNALS

(71) Applicant: Avaya Management L.P., Durham, NC (US)

(72) Inventor: Lawrence M. Lutton, Nashua, NH (US)

(73) Assignee: Avaya Management L.P., Durham, NC (US)

( * ) Notice: Subject to any disclaimer, the term of this patent is extended or adjusted under 35 U.S.C. 154(b) by 155 days.

(21) Appl. No.: 17/354,019

(22) Filed: Jun. 22, 2021

(65) Prior Publication Data

US 2022/0094722 A1 Mar. 24, 2022

Related U.S. Application Data

(60) Provisional application No. 63/082,536, filed on Sep. 24, 2020.

(51) Int. Cl.
*H04L 65/1069* (2022.01)
*H04L 43/10* (2022.01)
(Continued)

(52) U.S. Cl.
CPC .......... *H04L 65/1069* (2013.01); *H04L 43/10* (2013.01); *H04L 65/65* (2022.05); *H04L 65/764* (2022.05)

(58) Field of Classification Search
None
See application file for complete search history.

(56) References Cited

U.S. PATENT DOCUMENTS 7,310,529 B1 * 12/2007 Lodge ................. H04W 72/542
455/445
7,684,553 B2 * 3/2010 Wallenius ........... H04L 65/1104
370/352

(Continued)

FOREIGN PATENT DOCUMENTS

EP 3191977 10/2019

OTHER PUBLICATIONS

Camarillo et al. "Integration of Resource Management and Session Initiation Protocol (SIP)," The Internet Society, Oct. 2002, RFC 3312, 31 pages.

(Continued)

*Primary Examiner* — Backhean Tiv
(74) *Attorney, Agent, or Firm* — Sheridan Ross P.C.

(57) ABSTRACT

Methods and systems provided herein ensure that communication sessions established between select parties, and communication devices, are in complete compliance with a predefined condition, or precondition. Upon determining content and addressing of a communication session, at least one precondition for communications is retrieved from a memory device. The precondition corresponds to a required condition for a communication session to be enabled and maintained. Once the precondition is met, the communication session is established and, as long as the precondition remains intact, the communication session is allowed to be maintained. Ensuring that the precondition exists and remains intact includes embedding an authentication signal, that is based on the precondition, along with communications made in the communication session. When at least a portion of the precondition is no longer met, the communication session is instantaneously terminated.

20 Claims, 8 Drawing Sheets

(51) Int. Cl.
  *H04L 65/65* (2022.01)
  *H04L 65/75* (2022.01)

(56) References Cited

U.S. PATENT DOCUMENTS

| | | | | |
|---|---|---|---|---|
| 7,787,383 | B2* | 8/2010 | Bali | H04L 43/0811 |
| | | | | 714/21 |
| 7,894,410 | B2* | 2/2011 | Zhou | H04L 69/40 |
| | | | | 370/395.2 |
| 8,059,656 | B1* | 11/2011 | Telikepalli | H04L 47/765 |
| | | | | 370/428 |
| 8,077,626 | B2* | 12/2011 | Ginde | H04L 65/80 |
| | | | | 370/252 |
| 8,472,453 | B2* | 6/2013 | Bangalore | H04L 65/104 |
| | | | | 370/467 |
| 8,582,566 | B2* | 11/2013 | Bae | H04L 65/1069 |
| | | | | 370/352 |
| 8,619,631 | B2* | 12/2013 | Matsuo | H04L 67/1085 |
| | | | | 370/255 |
| 8,786,136 | B2* | 7/2014 | Takasu | H04W 76/14 |
| | | | | 307/104 |
| 8,970,659 | B1* | 3/2015 | Anderson | H04L 65/1076 |
| | | | | 348/14.09 |
| 9,025,553 | B2* | 5/2015 | Stille | H04L 65/1083 |
| | | | | 370/352 |
| 9,118,654 | B2* | 8/2015 | Anderson | H04W 24/00 |
| 10,986,685 | B2* | 4/2021 | Shi | H04W 60/04 |
| 11,096,242 | B2* | 8/2021 | Atarius | H04W 28/0236 |
| 11,394,729 | B2* | 7/2022 | Verma | H04L 63/1433 |
| 11,412,009 | B1* | 8/2022 | Mogal | H04L 65/1073 |
| 11,659,047 | B2* | 5/2023 | Kaippilly | H04L 43/10 |
| | | | | 709/228 |
| 2004/0139088 | A1* | 7/2004 | Mandato | H04L 9/40 |
| 2005/0021868 | A1* | 1/2005 | Sharma | H04L 67/14 |
| | | | | 709/250 |
| 2005/0089054 | A1* | 4/2005 | Ciancaglini | H04L 49/3027 |
| | | | | 370/412 |
| 2005/0259796 | A1* | 11/2005 | Wallenius | H04Q 3/0037 |
| | | | | 379/211.02 |
| 2007/0160058 | A1* | 7/2007 | Zhou | H04L 65/1043 |
| | | | | 370/395.2 |
| 2008/0013544 | A1* | 1/2008 | Ginde | H04L 65/1101 |
| | | | | 370/465 |
| 2010/0312832 | A1* | 12/2010 | Allen | H04L 65/1104 |
| | | | | 709/204 |
| 2013/0117829 | A1* | 5/2013 | Potter | H04L 9/3247 |
| | | | | 709/217 |
| 2013/0155889 | A1* | 6/2013 | Brownworth | H04W 36/14 |
| | | | | 370/252 |
| 2015/0106629 | A1* | 4/2015 | Anderson | H04N 7/152 |
| | | | | 726/4 |
| 2015/0200802 | A1* | 7/2015 | Sawal | H04L 45/22 |
| | | | | 370/228 |
| 2016/0088532 | A1* | 3/2016 | Chen | H04W 36/0077 |
| | | | | 370/331 |
| 2016/0241683 | A1* | 8/2016 | Ye | H04L 65/1069 |
| 2016/0366190 | A1* | 12/2016 | Xiao | H04L 65/1069 |
| 2021/0219131 | A1* | 7/2021 | Byadgi | H04L 69/24 |
| 2022/0060585 | A1* | 2/2022 | Patel | H04M 7/006 |
| 2022/0094722 | A1* | 3/2022 | Lutton | H04L 65/1069 |

OTHER PUBLICATIONS

Shacham et al. "Use of the SIP Preconditions Framework for Media Privacy," The Internet Society, Jun. 25, 2006, Internet Draft, 9 pages.
Extended Search Report for European Patent Application No. 21198665.8, dated Jan. 20, 2022 11 pages.
Official Action for European Patent Application No. 21198665.8, dated Mar. 6, 2023 9 pages.
Intent to Grant for European Patent Application No. 21198665.8, dated Feb. 14, 2024 58 pages.

* cited by examiner

METHODS AND SYSTEMS FOR MAINTAINING CONDITIONAL COMMUNICATION SESSIONS USING TERMINABLE AUTHENTICATION SIGNALS

CROSS REFERENCE TO RELATED APPLICATION

The present application claims the benefit of and priority, under 35 U.S.C. § 119(e), to U.S. Provisional Application Ser. No. 63/082,536, filed Sep. 24, 2020, entitled "Call Condition Guarantor," the entire disclosure of which is hereby incorporated herein by reference, in its entirety, for all that it teaches and for all purposes.

BACKGROUND

Embodiments of the present disclosure relate generally to communication methods and specifically to call admission control.

Call Admission Control ("CAC") has been traditionally used to prevent an oversubscription of networking resources. CAC is often used in the call setup phase of a Voice over Internet Protocol ("VoIP") call and applies to the media traffic portion of the call rather than the data traffic portion of the call. CAC was designed to ensure that sufficient bandwidth is available on a network to support authorized media flows.

BRIEF SUMMARY

With increased security concerns and more enterprise users working remotely, there is an increased desire to enhance the security of calls and communications occurring over a network. Some network users have requested their network providers to guarantee, with complete assurance, that certain conversations are recorded. While these network users are requesting the guarantee to be made with 100% certainty, the network providers have not been able to completely comply with the 100% certainty request. Instead, network providers give assurances with some room for error (e.g., a guarantee with a 99.99% certainty). Any room for uncertainty may not be acceptable to some network users given the nature of calls that occur over the network. For instance, certain types of calls absolutely need a recording to comply with regulatory or business requirements.

It is, therefore, an aspect of the present disclosure to provide complete assurances (with 100% certainty) that certain call requirements are met before and during a call. In particular, the present disclosure aims to assure that a set of conditions or preconditions are met before establishing a communication session and that those conditions remain intact throughout the entire duration of the communication session. As used herein, the term "call" should be construed to include any type of electronic communication, whether real-time, near-real-time, or asynchronous. A call may include a voice call, a video call, a web chat, a web conference, a co-browsing session, or the like. A communication session may include one or many calls and the communication session may be between human participants, human and automated participants (e.g., chatbot or Interactive Voice Response ("IVR") components), and combinations thereof.

In a non-limiting example, the present disclosure may be used to ensure a condition or precondition that Party A may not speak to Party B via telephone call or video conference without representation (e.g., Party C or a call recording function) present on the call/conference. The problem is twofold: (1) to prevent Parties A and B from contacting each other without Party C or call recording present; and (2) to discontinue the communication session between Parties A and B if Party C or call recording becomes disconnected from the call/conference.

The present commercial practice is to attempt recording of all calls at the point of ingress to the network (e.g., a Session Border Controller ("SBC"), server, etc.) using a redundant call recording system. This creates a high likelihood (e.g., with a 99.99% certainty) that all calls that transit the ingress point will be recorded (that is, most of them will be recorded).

Presently available solutions do not fully address the problems outlined above (customer specific or general) and create network topology limitations that increase operating cost and reduce call quality issues.

Example 1 (feature gap): present solutions do not disconnect parties A and B if party C is disconnected.

Example 2 (network topology): present solutions lose control of communication sessions that are "shuffled" (e.g., rerouted) so that the media stream no longer transits the private network ingress point.

Example 3 (feature gap): present solutions cannot disconnect parties A and B if their connection to the switch is lost.

It is, therefore, an aspect of the present disclosure to provide a communication method and system that supports a 100% guarantee of a precondition being met prior to establishing a call and then continuing to guarantee that the precondition is met for the entirety of the call. This guarantee can be made by modifying endpoints (e.g., Session Initiation Protocol ("SIP") User Agents), ingress points (e.g., SBCs, etc.), and/or servers that provide communication features (e.g., a communication server).

In one embodiment, the SIP User Agent(s) (e.g., telephones, software communication clients, softphones, mobile phones, etc., and/or other communication devices) of a network may be configured to: a) only allow communication sessions to be established if the User Agent is in receipt of an enabling signal (e.g., referred to herein as the "heartbeat"); and b) terminate communication sessions immediately upon cessation of receiving the heartbeat signal at a predetermined interval.

In one embodiment, the ingress points of the network may be configured to: a) only allow communication sessions to be established if the User Agent is in receipt of an enabling signal (e.g., the "heartbeat"); and b) terminate communication sessions immediately upon cessation of receiving the heartbeat signal at a predetermined interval.

In one embodiment, a communication server of a network may be configured to: a) only allow communication sessions to be established if the User Agent is in receipt of an enabling signal (e.g., the "heartbeat"); and b) terminate communication sessions immediately upon cessation of receiving the heartbeat signal at a predetermined interval.

By modifying User Agent(s), ingress point(s), and/or communication servers of a network as provided above, embodiments of the present disclosure provide advantages compared to prior solutions. For instance, the present disclosure enables a network provider or vendor to guarantee with cryptographic certainty that: a) call admission criteria are met prior to establishment of a communication session; and b) call admission criteria are met throughout the entire lifecycle of a communication session without regard to network topology (e.g., remote agents).

The present disclosure also provides an assurance of regulatory compliance and compliance with business policies. Advantageously, the present disclosure can be implemented as an "over the top," "cloud" service with no customer network or endpoint prerequisites. Additionally or alternatively, the proposed solution can be built into endpoints (e.g., telephones, software communication clients, and/or other communication devices) for use on third-party networks (e.g., as a cloud solution). In accordance with at least some embodiments, establishing AND continuing a communication session is dependent upon a positive control mechanism instead of upon statistical methodologies (e.g., redundancy).

One aspect of the present disclosure is to use a deterministic, positive-control (e.g., "failsafe") methodology to enforce regulatory and/or business requirements, versus the use of stochastic "high availability" technology.

DETAILED DESCRIPTION

Figure 1:
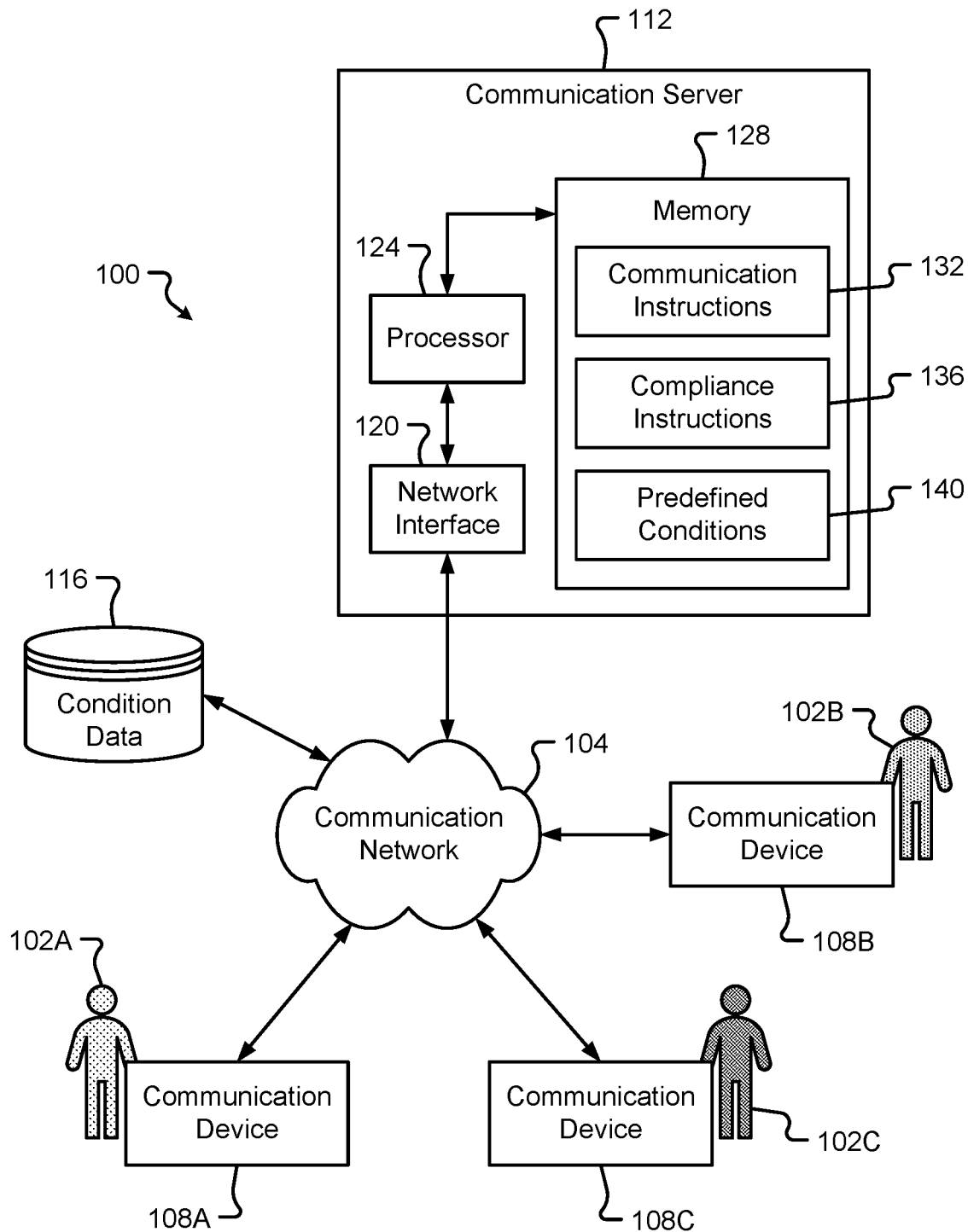
FIG. 1 depicts a block diagram of a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

It is with respect to the above issues and other problems that the embodiments presented herein were contemplated. It is an object of the present disclosure to provide secure communication sessions established between select parties are in complete compliance with a predetermined or predefined condition, or precondition. In one embodiment, upon determining content and addressing of a communication session, at least one precondition for communications may be retrieved from a memory storage device. Until the precondition is met, the communication session will be prevented, or blocked, from being able to be established. Once the precondition is met, however, the communication session may be established. As long as the precondition remains intact, the communication session will be allowed to be maintained and can continue uninterrupted. In some embodiments, ensuring that the precondition exists and remains intact includes referring to an authentication signal, that is based on the precondition, in one or more communications made in the communication session. When at least a portion of the precondition is no longer met, the communication session may be instantaneously terminated.

The terms "predefined condition," "precondition," "conditional requirement," "call requirement," and/or variations thereof may be used interchangeably herein and may refer to at least one required condition that must be met for a communication session to be established and/or maintained. Examples of preconditions may include, but are in no way limited to, a requirement that a call be recorded, a requirement that a call include at least one third party (e.g., a party other than the source party and the destination party of the call), a call be logged, a call have a specific call quality for a period of time, and/or the like. The terms "call" and "communication session" and/or variations thereof may be used interchangeably herein and may refer to the exchange of voice and/or data communications across one or more communication channels established between different endpoints (e.g., telephones, software communication clients, mobile devices, any other communication device, and/or combinations thereof) in a communication system.

Among other things, the ability to prevent communications and/or disable communications when a precondition is no longer met, allows a communication system to guarantee with certainty that all calls are in 100% compliance with a given precondition. In some embodiments, the methods and systems described herein may continuously monitor a communication session and, upon determining at least one precondition is no longer met, instantaneously (and automatically) disable, or terminate, the communication session. In this manner, only calls that meet the precondition for an entirety of the call are allowed to be maintained from start to finish.

Referring now to FIG. 1, a block diagram of a communication system 100 is shown in accordance with at least some embodiments of the present disclosure. The communication system 100 of FIG. 1 may be a distributed system and, in some embodiments, comprises a communication network 104 connecting one or more communication devices 108A-108C with a communication server 112. The communication system 100 may include, but is not limited to, a first communication device 108A, a second communication device 108B, a third communication device 108C, a communication server 112, and a condition data memory storage device 116. The communication server 112 may provide collaborative communication sessions, conference meetings, multi-party calls, SIP functionality, and/or other audio/video communication services. In some embodiments, the communication server 112 may correspond to an SBC, or other communications controller, through which communications pass as part of a communication session established between two or more communication devices 108A-108C.

Although the communication server 112 may control communication sessions between the communication devices 108A-108C, it should be appreciated that the functionality of the communication server 112 may be provided by at least one of the communication devices 108A-108C in the communication system 100. Stated another way, the communication devices 108A-108C may comprise the various instructions, conditions, rules, and/or data shown as part of the communication server 112. In this manner, the communication devices 108A-108C may communicate with one another across the communication network 104 without requiring inclusion of the communication server 112 to provide the conditional requirements and compliance assurances described herein.

It is an aspect of the present disclosure that the users 102A-102C may establish a communication session with one another upon satisfying any required condition stored in memory. In particular, the each of the users 102A-102C may use a respective communication device 108A-108C to initiate a call and dial out to another user 102A-102C across the communication network 104. Upon initiating the call, one or more devices (e.g., communication devices 108A-108C, communication server 112, etc.) in the communication system 100 may determine whether any preconditions exist that are required for establishing a communication session between a source communication device 108 (e.g., the initiator of the call) and a destination communication device 108 (e.g., the intended recipient of the call). Although only three users 102A-102C and corresponding communication devices 108A-108C are illustrated in FIG. 1, it should be appreciated that the communication system 100 may comprise any number of users 102 and communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol ("IP") network consisting of many computers, computing networks, and other communication devices located all over the world, which are connected through many telephone systems and other means. Other examples of the communication network 104 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a SIP network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

In some embodiments, at least one of the communication devices 108A-108C may correspond to a computing device, a personal communication device, a portable communication device, a laptop, a smartphone, a tablet, a personal computer, and/or any other communication device capable of running an operating system ("OS"), at least one voice application, communication instructions, and/or the like. The communication devices 108A-108C may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 108A-108C, may also have any of a variety of applications, including for example, voice applications, chat applications, calling applications, email applications, SIP applications, etc., and/or combinations thereof. Additionally or alternatively, the communication devices 108A-108C, in some embodiments, may be any other electronic device, such as an Internet-enabled mobile telephone and/or a personal digital assistant, capable of communicating via the communication network 104.

In some embodiments, communications may be sent and/or received via a respective communication device 108A-108C as a telephone call, a packet or collection of packets (e.g., IP packets transmitted over an IP network), an email message, an instant message ("IM"), a short message service ("SMS") message, a multimedia messaging service ("MMS") message, a chat, and/or combinations thereof. In some embodiments, the communication devices 108A-108C may communicate over an audio and/or a video channel over the communication network 104.

The communication server 112 may include hardware and/or software resources that, among other things, provides the ability for controlling calls between users 102 (e.g., via associated communication devices 108, etc.) based on at least one predefined condition, or precondition. Among other things, the communication server 112 may provide communication functionality that allows the communication devices 108A-108C to hold party-to-party calls, multi-party calls, conference calls, and/or other collaborative communications over a same communication channel, in an established communication session. The communication server 112 may include a network interface 120, a processor 124, and a memory 128. The memory 128 may comprise communication instructions 132, compliance instructions 136, predefined condition data 140, and/or the like.

The network interface 120 provides the communication server 112 with the ability to send and receive communication packets or the like over the communication network 104. The network interface 120 may be provided as a network interface card ("NIC"), a network port, a modem, drivers for the same, and the like. Communications between the components of the communication server 112 and other devices connected to the communication network 104 may flow through the network interface 120 of the communication server 112. In some embodiments, examples of a suitable network interface 120 include, without limitation, an antenna, a driver circuit, an Ethernet port, a modulator/demodulator, an NIC, an RJ-11 port, an RJ-45 port, an RS-232 port, a USB port, etc. The network interface 120 may include one or multiple different network interfaces depending upon whether the communication server 112 is connecting to a single communication network or multiple different types of communication networks. For instance, the communication server 112 may be provided with both a wired network interface and a wireless network interface without departing from the scope of the present disclosure. In some embodiments, the network interface 120 may include different communications ports that interconnect with various input/output lines.

In some embodiments, the processor 124 may correspond to one or more computer processing devices. For example, the processor 124 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 124 may be provided as a Central Processing Unit ("CPU"), a microprocessor, or a plurality of microprocessors that are configured to execute the instructions sets stored in memory 128. Upon executing the instruction sets stored in memory 128, the processor 124 enables various communications, compliance (e.g., authentication, checking, verification, and/or authorization, etc.), and/or interaction functions of the communication server 112, and may provide an ability to establish and maintain communication sessions between communication devices (e.g., communication devices 108A-108C, etc.) over the communication network 104 when specific predefined conditions are met.

The memory 128, or storage memory, may correspond to any type of non-transitory computer-readable medium. In some embodiments, the memory 128 may comprise volatile or non-volatile memory and a controller for the same. Non-limiting examples of the storage memory 128 that may be utilized in the communication server 112 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 128 may be used to store information about communications, identifications, conditional requirements, times, authentication, authorization, compliance, history, and/or the like. In some embodiments, the memory 128 may be configured to store rules and/or the instruction sets depicted in addition to temporarily storing data for the processor 124 to execute various types of routines or functions. Although not depicted, the memory 128 may include instructions that enable the processor 124 to store data into a condition data memory storage device 116 and retrieve information from the condition data memory storage device 116. In some embodiments, the condition data memory storage device 116 or the data stored therein may be stored internal to the communication server 112 (e.g., within the memory 128 of the communication server 112 rather than in a separate database) or in a separate server.

The communication instructions 132, when executed by the processor 124, may provide the ability for at least one of the communication devices 108A-108C associated with a user 102A-102C to establish one or more communication sessions that enable calls, messaging, holding or conducting communications, and/or otherwise sending and receiving messages via the communication session. In accordance with embodiments of the present disclosure the communication instructions 132 may comprise instructions that, when executed by the processor 124, only enable communication sessions when specific and associated preconditions (e.g., stored in the predefined condition data 140 memory location, the condition data memory storage device 116, etc.) are met and maintained. The communication instructions 132 may use existing private branch exchange ("PBX") equipment, services, and/or infrastructure. The communication server 112 and the processor 124 executing the communication instructions 132 may enable call routing, call authorization, and call termination. Examples of other functions performed via the communication instructions 132, when executed by the processor 124, include, but are in no way limited to, normalizing disparate networks, providing centralized routing of calls and management of user profiles, supporting converged voice and video bandwidth management, providing application sequencing capabilities, etc., and/or combinations thereof.

In some embodiments, the communication instructions 132 may define rules and instructions for interactions between the communication server 112 and at least one of the communication devices 108A-108C in the communication system 100. The communication instructions 132 may cause applications, web pages, pop-ups, and/or other digital interactions to be presented by the display of a communication device 108. The communication instructions 132, when executed by the processor 124, may determine to present a user 102 with one or more voice application pages, call options, compliance notifications, compliance information, request input, and/or provide other forms of output. These interactions may be provided by sending a message to a communication device 108A-108C over the communication network 104 in the communication system 100 causing a display device of the communication device 108A-108C to render information and user-selectable options. The communication instructions 132 may work in conjunction with the compliance instructions 136, or vice versa, to perform at least some steps of the methods described in conjunction with FIGS. 6-8, and as otherwise described herein.

The communication server 112 may comprise communication session precondition guarantee resources, such as the compliance instructions 136 and/or the predefined condition data 140 stored in the memory 128 and/or in the condition data memory storage device 116. In some embodiments, the compliance instructions 136, when executed by the processor 124, may send and receive messages across the communication network 104 to one or more communication devices 108A-108C in the communication system 100 for enabling and/or maintaining a communication session. The compliance instructions 136 may define rules and instructions for determining whether a communication session complies with one or more preconditions. The compliance instructions 136, together with the communication instructions 132 and the predefined condition data 140, may determine authentication signals required for a specific communication session to be established, verify authentication signals during a time that the communication session is established, and guarantee compliance for communication sessions. In some embodiments (e.g., when the compliance instructions 136 determine that a precondition is no longer met during a communication session), the compliance instructions 136 may together with the communication instructions 132 instantaneously terminate or disable a communication session between communication devices 108A-108C. The compliance instructions 136 may continually, or periodically, monitor a communication session in determining whether the precondition is met throughout a call between two or more communication devices 108A-108C. Additionally or alternatively, the compliance instructions 136, when executed by the processor 124, may create, delete, modify, and/or otherwise update records (e.g., communication message data structures, conditional requirements data, etc.) for at least one user 102, communication session, communication device 108, etc., and/or combinations thereof. The compliance instructions 136 may work in conjunction with the communication instructions 132, or vice versa, to perform at least some steps of the methods described in conjunction with FIGS. 6-8, and as otherwise described herein.

The predefined condition data 140 may comprise at least one required condition for a communication session to be established and maintained. In some embodiments, the preconditions may not apply to all communications and communication sessions. Preconditions may correspond to requirements that are required for specific communications, specific parties, specific topics, etc., and/or combinations thereof. For example, calls between two parties may be required to be recorded to ensure compliance with local or federal regulations. In this case, the precondition would correspond to a call recording requirement. As another example, a call between a sales associate and a buyer may require a third party legal representative to be included on the call. In this example, the precondition would correspond to a requirement that a third party (e.g., the legal representative) be included in the communication session. Other examples of preconditions may include, but are in no way limited to, call logging, call quality monitoring, guaranteed call recording (e.g., requiring verification that information sent from one party is received by a second party, without distortion or missing information, within a threshold range), call reporting, voice-to-text conversion, etc., and/or combinations thereof. Without the precondition required for a particular communication session, the communication session cannot be established and/or maintained between communication devices 108A-108C. Among other things, this approach guarantees that communications are held only when the precondition is in place and maintained during a call.

Figure 2:
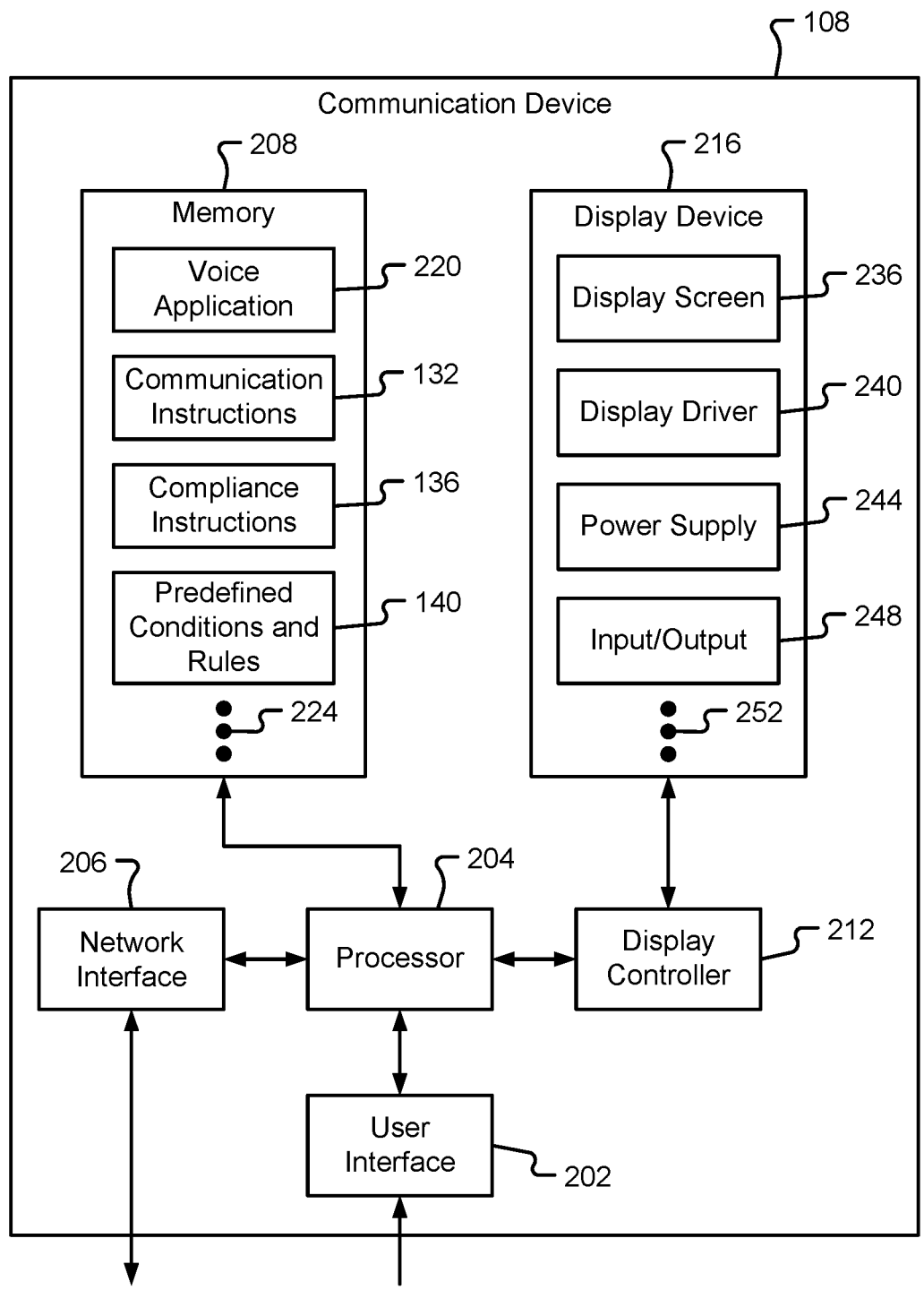
FIG. 2 is a block diagram depicting components of a communication device used in a communication system in accordance with at least some embodiments of the present disclosure.

FIG. 2 is a block diagram depicting components of a communication device 108 used in the communication system 100 in accordance with at least some embodiments of the present disclosure. The communication device 108 may correspond to any of the communication devices 108A-108C described in conjunction with FIG. 1, and vice versa. The communication device 108 is shown to include a computer memory 208 that stores one or more instruction sets, applications, rules, information, or modules. The communication device 108 may be configured as a desktop computer, smartphone, tablet, laptop, and/or the like. The communication device 108 is also shown to include a user interface 202, one or more processors 204, a network interface 206 (e.g., a network communications interface, etc.), and a display controller 212 that may all be connected to one another via a power and/or a communications bus.

The user interface 202 may correspond to any type of input and/or output device, or combination thereof, that enables a user 102 to interact with the communication device 108. As can be appreciated, the nature of the user interface 202 may depend upon the nature of the communication device 108. Examples of the user interface 202 may include, but are in no way limited to, user interface hardware and devices such as at least one touch-sensitive display elements, buttons, switches, keyboards, peripheral interface devices (e.g., mice, controller, joysticks, etc.) as described herein. It is an aspect of the present disclosure that one or more devices in the user interface 202 may provide an input that is interpreted by the processor 204 in controlling one or more components of the communication device 108.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM1926EJ-S™ processors, other industry-equivalent processors, and may perform computational functions using any known or future-developed standard, instruction set, libraries, and/or architecture. The processor 204 may be a multipurpose, programmable device that accepts digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system. The processor 204 may be similar, if not identical, to the processor 124 described in conjunction with FIG. 1, or vice versa.

The network interface 206 may comprise hardware that facilitates communications with other communication devices (e.g., the communication server 112, other communication devices and/or servers, etc.) over the communication network 104. In some embodiments, the network interface 206 may include an Ethernet port, a Wireless Fidelity ("Wi-Fi") card, an NIC, a cellular interface (e.g., antenna, filters, and associated circuitry), or the like. The network interface 206 may be configured to facilitate a connection between the communication device 108 and the communication server 112, and/or another communication device 108, via the communication network 104 and may further be configured to encode and decode communications (e.g., packets, etc.) according to a protocol utilized by the communication network 104.

The memory 208 may correspond to any type of non-transitory computer-readable medium. In some embodiments, the memory 208 may comprise volatile or non-volatile memory and a controller for the same. Non-limiting examples of memory 212 that may be utilized in the communication device 108 may include RAM, ROM, buffer memory, flash memory, solid-state memory, and/or variants thereof. Any of these memory types may be considered non-transitory computer memory devices even though the data stored thereby can be changed one or more times. In some embodiments, the memory 208 may be configured to store rules and/or the instruction sets depicted in addition to temporarily storing data for the processor 124 to execute various types of routines or functions. The computer memory 208 may store a voice application 220, communication instructions 132, compliance instructions 136, predefined condition data 140, and/or more 224. The communication instructions 132, compliance instructions 136, and the predefined condition data 140 may be similar, if not identical, to the instructions and data as described in conjunction with FIG. 1. In some embodiments, the communication device 108 may communicate to another communication device 108 across the communication network 104 without requiring inclusion of the communication server 112. In this case, the functionality surrounding guaranteeing compliance can be performed at one or more of the communication devices 108 rather than a communication server 112.

The voice application 220 stored in the computer memory 208 of the communication device 108 may correspond to a VoIP client, or softphone application, or other application that enables calling (e.g., voice, VoIP, etc.) and/or provides access to contact lists, voicemail, chat functionality, unified communications, and/or the like. The voice application 220 may refer to the communication instructions 132, the compliance instructions 136, and the predefined condition data 140 stored in the computer memory 208 in determining whether a communication session can be established and/or maintained based on preconditions. Data used by the voice application 220 may be stored locally on the communication device 108, in a condition data memory storage device 116, and/or in the communication device 108 of a communication server 112.

In some embodiments, the communication device 108 may comprise at least one display device 216 that renders information, applications, windows, interactive elements, and/or other visual output to at least one display screen 236. The communication device 108 may include at least one display controller 212 that controls an operation of the display device 216. This operation may include the control of input (e.g., input provided by the user 102 via the user interface 202, command input via the instruction sets in memory 208, and/or combinations thereof, etc.), output (e.g., display, rendered images, window behavior, etc.) and/or other functions of the display controller 212 and display device 216.

As described above, the display device 216 may comprise at least one display screen 236 that selectively activates pixels and/or display elements to render one or more applications, windows, controls, interactive elements, icons, characters, images, etc. Examples of the display screen 236 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device 216 may be configured to render information in one or more discrete areas (e.g., backgrounds, portions, windows, zones, etc.) of the display screen 236 or superimposed in an area of the display screen 236.

The display device 216 may include a display driver 240, a power supply 244, an input/output 248, and/or other components 252 that enable operation of the display device 216. The display driver 240 may receive commands and/or other data provided by the processor 204 and one or more of the instruction sets in memory 208. In response to receiving the commands, the display driver 240 may generate the driving signals necessary to render the appropriate images to the display screen 236.

The power supply 244 may provide electric power to one or more components of the display device 216. In one embodiment, the power supply 252 may include a transformer and/or other electronics that prevent overloading, condition power signals, and/or provide backup power to the display device 216. The input/output 248 may correspond to one or more connections for receiving or exchanging information and/or video from components of the communication device 108 (e.g., the processor 204, etc.). The input/output 248 may comprise a high-definition multimedia interface ("HDMI") input, DisplayPort ("DP") input, Ethernet, composite video, component video, H.264, or some other video connection type.

Figure 3:
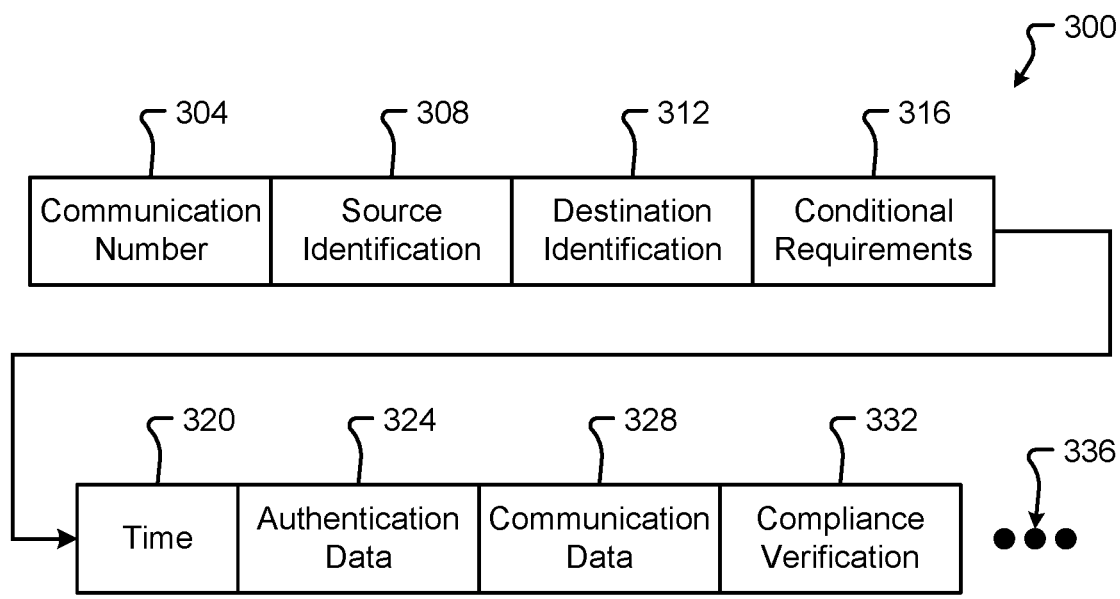
FIG. 3 is a block diagram depicting a communication message data structure used in accordance with embodiments of the present disclosure.

Referring to FIG. 3, a block diagram depicting a communication message data structure 300 will be described in accordance with at least some embodiments of the present disclosure. The communication message data structure 300 may include a number of fields that may be used in the various communication flows, methods, and processes outlined herein. For instance, the communication message data structure 300 shown may be associated with a particular communication device 108, call setup message initiated by a communication device 108, message sent as part of a communication session established between communication devices 108, and/or the like. In some embodiments, the communication message data structure 300 may be stored in the condition data memory storage device 116, the memory 128 of the communication server 112, and/or the computer memory 208 of a communication device 108. Information stored in the communication message data structure 300 may be used (e.g., by one or more of the communication device 108 and the communication server 112, etc.) in determining whether a communication session is authorized based on preconditions associated with a user 102, a communication device 108, and/or combinations thereof. In some embodiments, (e.g., where the communication server 112 is responsible for handling call controls) at least some of the information stored in the communication message data structure 300 may be provided to the communication server 112 by a communication device 108 in the communication system 100. For instance, the communication device 108 may provide the communication message data structure 300 to the communication server 112, prior to establishing a communication session with another communication device 108. In this example, the communication message data structure 300 may be a part of a call setup message. In one embodiment, the communication message data structure 300 may be sent by at least one communication device 108 in establishing or maintaining a communication session. In embodiments where no communication server 112 is required, the communication message data structure 300 may be received by at least one communication device 108 running the communication instructions 132 and compliance instructions 136 in establishing or maintaining a communication session. Examples of the communication message data structure 300 data fields include, without limitation, a communication number field 304, a source identification field 308, a destination identification field 312, a conditional requirements field 316, a time field 320, an authentication data field 324, a communication data field 328, a compliance verification field 332, and more 336.

The communication number field 304 may comprise data used to identify the communication message sent by at least one of the communication devices 108A-108C. The communication number field 304 may comprise a sequence number, name, phrase, or string that uniquely identifies one message from another. In some embodiments, the communication number field 304 may correspond to a portion of a message header that identifies an order of the communication message relative to other communication messages that are sent and received.

The source identification field 308 and the destination identification field 312 may comprise data used to identify one user 102 and/or an associated communication device 108 from others in the communication system 100. This identification may be a name, phrase, word, symbol, number, character, and/or combinations thereof. When identifying a user 102, this data may include an email address, employee number, alias, photo, or a string of characters to differentiate one user 102 from another in the communication system 100. In some embodiments, the identification may correspond to a typical phone number comprising a plurality of ordered digits. The identification may be used to uniquely identify the extension of one user 102 from another in the communication system 100. Different users, or parties, 102A-102C have different phone numbers or identifications. The identification may include an Integrated Circuit Card Identification ("ICCID") number, International Mobile Equipment Identity ("IMEI"), International Mobile Subscriber Identity ("IMSI") number, IP address, Media Access Control ("MAC") address, etc., and/or any other data used to uniquely identify one communication device 108 from another in the communication devices 108A-108C associated with a user 102. In some embodiments, the data stored in the source identification field 308 may be used (e.g., by the communication device 108 and/or the communication server 112) in determining whether any preconditions are associated with the source (e.g., user 102 and/or the communication device 108) identified in the source identification field 308. In some embodiments, this determination may be made by accessing predefined condition data 140 stored in memory and searching for entries including the source identification. Additionally or alternatively, the data stored in the destination identification field 312 may be used (e.g., by the communication device 108 and/or the communication server 112) in determining whether any preconditions are associated with the destination (e.g., user 102 and/or the communication device 108) identified in the destination identification field 312. While each identification field 308, 312 may be used to uniquely identify a particular contact (e.g., a user 102 and/or an associated communication device 108), the source identification field 308 identifies the creator or creator device of the communication message and the destination identification field 312 identifies the intended recipient or recipient device for the communication message. Stated another way, the source identification field 308 may be used to identify the sender of the message and the destination identification field 312 may be used to identify the receiver of the message.

The conditional requirements field 316 may comprise data about one or more call requirements, or preconditions, that must be met for the communication session between the source (e.g., first communication device 108A) and the destination (e.g., second communication device 108B) to be established and maintained. These preconditions may be retrieved from the predefined condition data 140 stored in the condition data memory storage device 116, the memory 128, and/or the computer memory 208. Once retrieved, the preconditions may be included, or embedded, in the communication message as part of the communication message data structure 300. In some embodiments, even if the call is transferred from one device to another in the communication system 100, the preconditions will follow the communication session guaranteeing compliance therewith.

The time field 320 may comprise data associated with a time of the creation of the communication message identified in the communication number field 304, a time associated with retrieval of the preconditions, a time that the communication session is authorized, a time that reverification of the precondition must commence, etc., and/or other time-based logs and information. In some embodiments, the time field 320 may include information such as a day, a time of day, month, year, and/or some other absolute or relative measurement of time. This information may be used by the compliance instructions 136 (e.g., via the communication server 112 and/or the communication device 108) in periodically or continually reevaluating the parameters of a communication session to determine whether the precondition is met and communications are authorized. The time field 320 may comprise a timer. Information from the time field 320 may be used to timestamp various points in the call (e.g., start time, end time, preconditions met time, preconditions failed time, forced termination time, etc.). The timestamps may be stored in the time field 320 and/or in one or more other fields of the communication message data structure 300.

The authentication data field 324 may comprise data corresponding to information used in authenticating a communication, or communication session, based on the preconditions being met. The information stored in the authentication data field 324 may include, but is in no way limited to one or more, checksums, hash codes, authentication signals, or other authentication verification code that is based on the preconditions for the communication session. In some embodiments, the authentication information may be algorithmically-created based on the preconditions. For instance, the compliance instructions 136 may determine information associated with each required precondition element and communication device 108 included, or to be included, in a communication session. This information (e.g., IP addresses, identifiers, acknowledgement signals, etc.) may be entered as input to an authenticator (e.g., a code algorithm) by the compliance instructions 136 to form an authentication verification code that defines when the preconditions are met as part of the communication session. During the communication session, the compliance instructions 136, when executed by a processor 124, 204, may verify that the authentication verification code matches an authentication signal, or heartbeat, that is based on a current state of the communication session. In particular, the heartbeat may correspond to real-time authentication information that is obtained from each required precondition element and communication device 108 included in the communication session while the communication session is in progress. In one embodiment, this real-time authentication information may be entered as input to the authenticator (e.g., the code algorithm) by the compliance instructions 136 to form the heartbeat. As can be appreciated, the heartbeat serves to indicate that the preconditions are still "alive" and present as part of the communication session. Continually ensuring that the authentication verification code matches the heartbeat ensures that the preconditions are always met while the communication session is in progress. In any event, the authentication verification code, the heartbeat, and/or the like may be stored in the authentication data field 324.

The communication data field 328 may comprise data corresponding to a "payload" of the communication message. The communication data field 328 may include voice, text, multimedia, or other data sent from one communication device 108 to another as part of the communication session. When the communication message is sent as a packet (e.g., a Transmission Control Protocol ("TCP") packet, etc.), the communication data field 328 may comprise the data portion of the packet.

The compliance verification field 332 may comprise data that defines whether a communication session was in compliance with one or more preconditions and/or did not meet the one or more preconditions at one or more times. The compliance verification field 332 may comprise data that is sent as part of the communication message and guarantees or reports that compliance was maintained for 100% of the time of the communication session. In some embodiments, the information in the compliance verification field 332 may confirm that the authentication verification code matched an authentication signal, or heartbeat, throughout an entirety of a communication session. For instance, upon determining that the authentication verification code matches the heartbeat, the compliance instructions 136, when executed by the processor 124, 204 may update the compliance verification field 332 of the communication message data structure 300 recording that the precondition was in place at a specific time during the communication session. In some embodiments, the record of the compliance may be accompanied by a timestamp (e.g., provided by the timer of the time field 320, etc.).

It is an aspect of the present disclosure that, as a call or communication session is handled or transferred, the information contained in the communication message data structure 300 may persist and, as such, the communication devices 108 and/or communication server 112 involved may consistently determine that communications are in, or out of, compliance.

Figure 4:
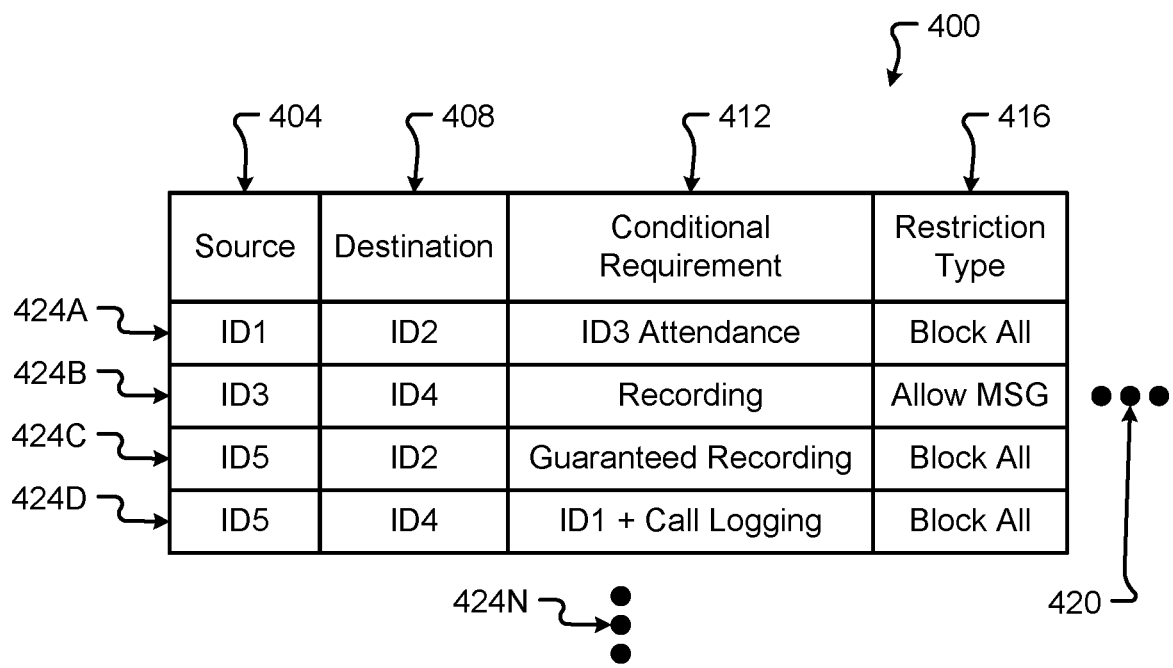
FIG. 4 is a block diagram depicting information associated with conditional requirements for communication sessions in accordance with embodiments of the present disclosure.

FIG. 4 is a block diagram depicting information associated with conditional requirements data structure 400 for communication sessions in accordance with embodiments of the present disclosure. The information illustrated in FIG. 4 may be made a part of a communication message data structure 300. For instance, the conditional requirements field 316 of the communication message data structure 300 may be retrieved from a memory location comprising the information illustrated in FIG. 4. Although the conditional requirements for a communication session are shown in the form of a table, it should be appreciated that embodiments of the stored conditional requirements data are not so limited. In some embodiments, the conditional requirements data, or conditional requirements data structure 400, may be stored in database, list, or other memory location.

The conditional requirements data structure 400 is shown as including a source identification column 404, a destination identification column 408, a conditional requirement column 412, and a restriction type column 416 for one or more communication sessions. Each record in the conditional requirements data structure 400 are identified in the record rows 424A-424N. It should be appreciated that the conditional requirements data structure 400 may include more or fewer columns and rows than shown in FIG. 4. For example, additional data may be stored for each record in additional columns 420. Additionally or alternatively, additional records may be included in additional rows 424N.

In FIG. 4, the first record row 424A may be associated with a first record in the conditional requirements data structure 400. In the first record row 424A, the source of the communication session is associated with ID1 and the destination with ID2. Stated another way, the conditional requirements shown in the conditional requirement column 412 of the first record row 424A apply to calls made from ID1 to ID2. In this example data structure 400, the precondition (e.g., the conditional requirement) requires that, if ID1 is in communication with ID2, ID3 must be included in the communication. Accordingly, to establish a communication session from ID to ID2, the precondition requires that ID3 is in attendance or connected to the call. If ID3 cannot be connected to the call, the communication session is blocked, as defined in the restriction type column 416 stating "Block All." In this manner, the restriction type column 416 may comprise data corresponding to actions that are available when one or more preconditions in the conditional requirement column 412 are not available. When ID3 cannot attend the call between ID1 and ID2, all communications are blocked (based on the restriction type of the first record row 424A).

The second record row 424B defines that communication from source ID3 to destination ID4 requires "Recording" as the precondition. If the recording functionality is not available, then messaging (e.g., voice or text messaging) is allowed based on the information contained in the restriction type column 416 of second record row 424B. Simply put, if the communication device 108 or user 102 identified by ID3 wishes to contact the communication device 108 or user 102 identified by ID4, and recording functionality is unavailable, voice and text messaging between ID3 and ID4 may still be allowed.

In the third record row 424C, when ID5 contacts ID2, the precondition of "Guaranteed Recording" may be required to allow communications (e.g., establishment and/or maintenance of a communication session between ID5 and ID2). A guaranteed recording precondition may require confirmation that packets sent by ID5 correspond to packets received by ID2. This confirmation may be based on comparing the content of the packet sent to the content of the packet received. In some embodiments, the guaranteed recording may allow confirmation that the packets send correspond to the packets received when the sent and received packets match within a percentage of accuracy (e.g., 95%, 98% or higher) of the originally sent packets. This approach can allow for some loss between sent and received packets while still guaranteeing that a threshold amount have been received.

The fourth record row 424D shows a precondition when ID5 contacts ID4. In this example, the precondition requires attendance by ID1 and call logging. The precondition requires that the user 102 and associated communication device 108 of ID1 be joined in the call at all times. Moreover, the precondition requires call logging of the communication session. In some embodiments, call logging may comprise monitoring and/or recording of interactions between the communication devices 108 participating in the communication session. The call logging may collect technical and statistical data about the communication session. This information may be used to ensure call quality and guarantee that call integrity was maintained during the communication session. In any event, any number of preconditions may exist and be recorded in the conditional requirements data structure 400 for one or more communication sessions, contacts, and/or the like.

Figure 5A:
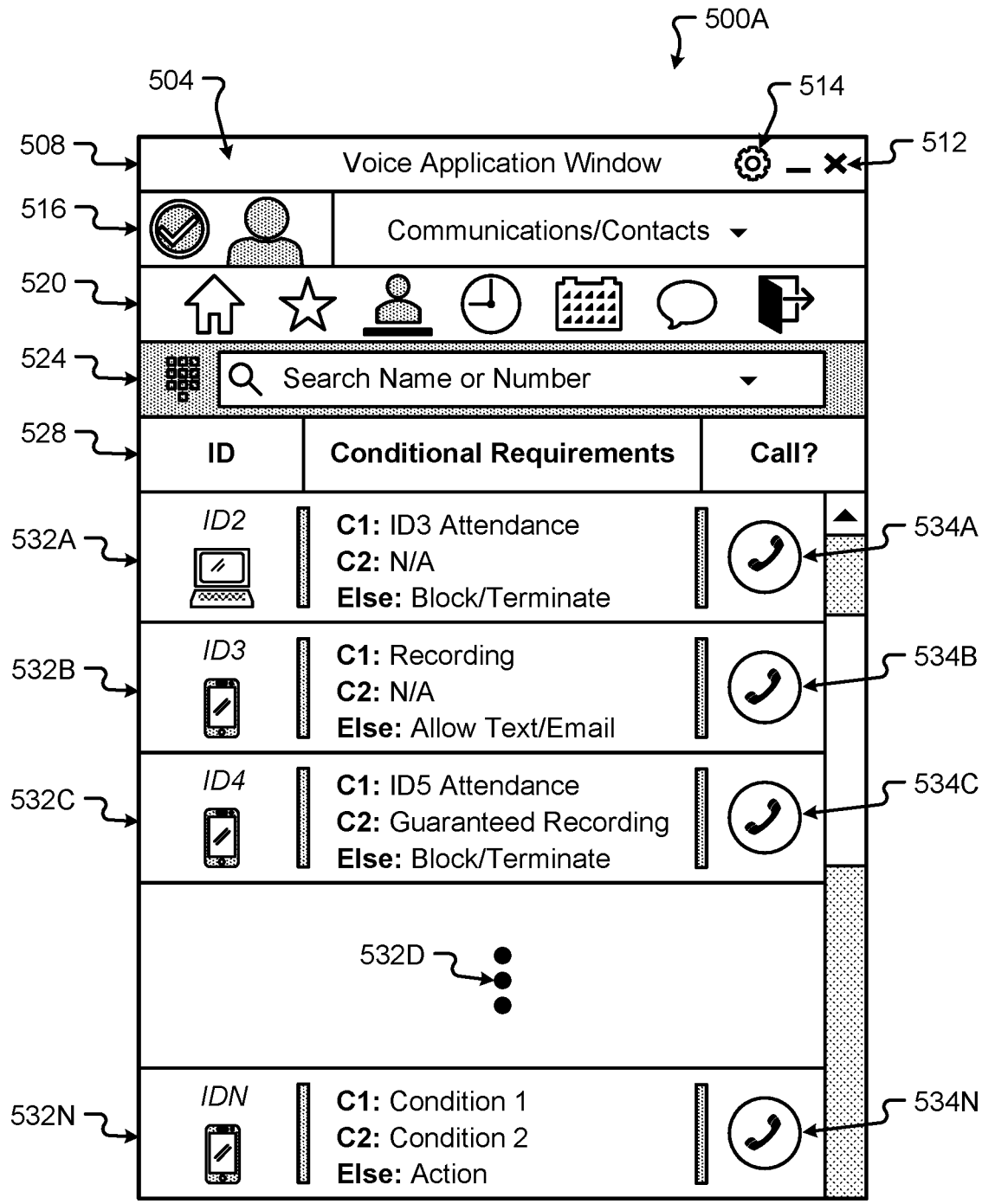
FIG. 5A is a block diagram depicting a first communication device interface presentation in accordance with embodiments of the present disclosure.
Figure 5B:
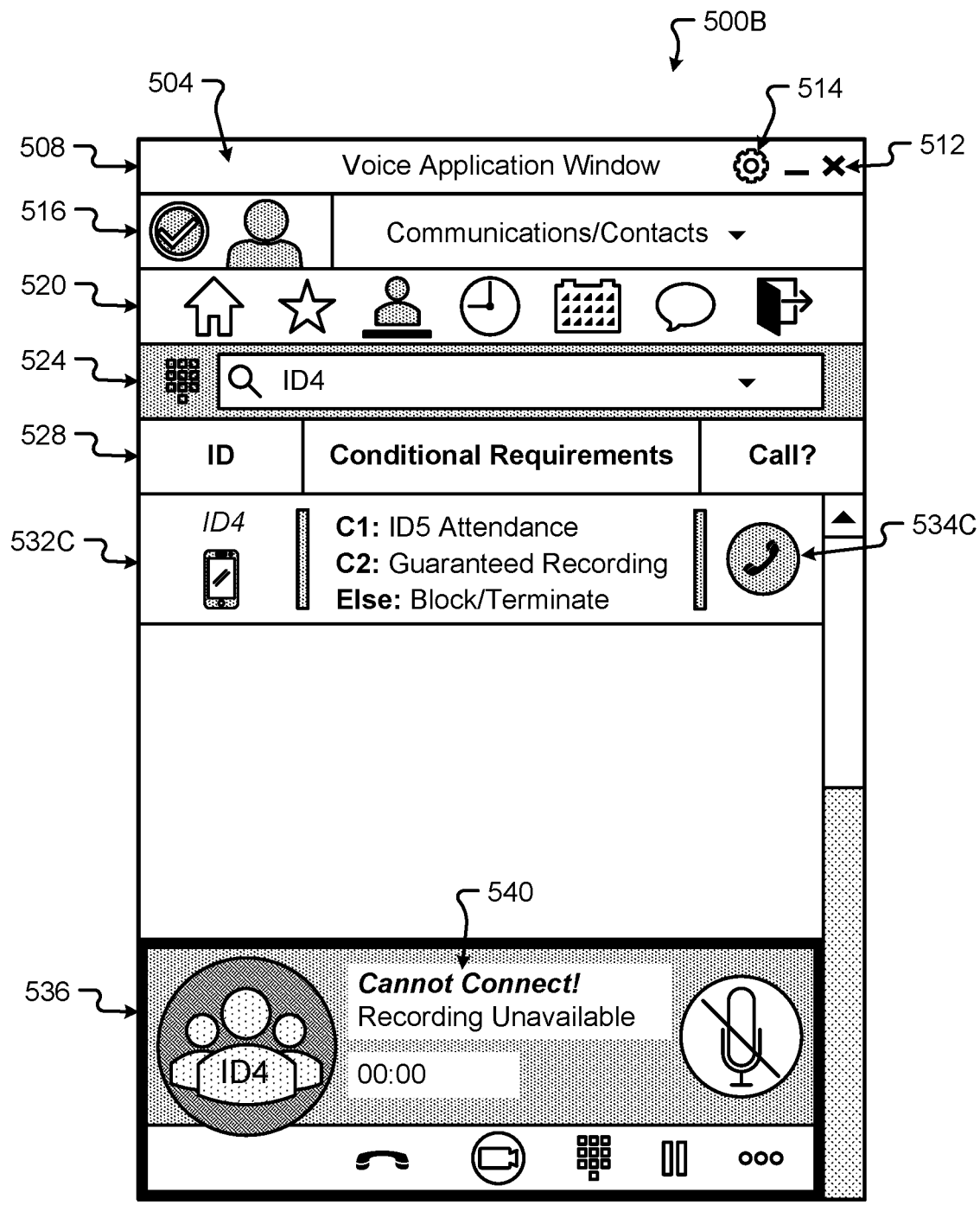
FIG. 5B is a block diagram depicting a second communication device interface presentation in accordance with embodiments of the present disclosure.
Figure 5C:
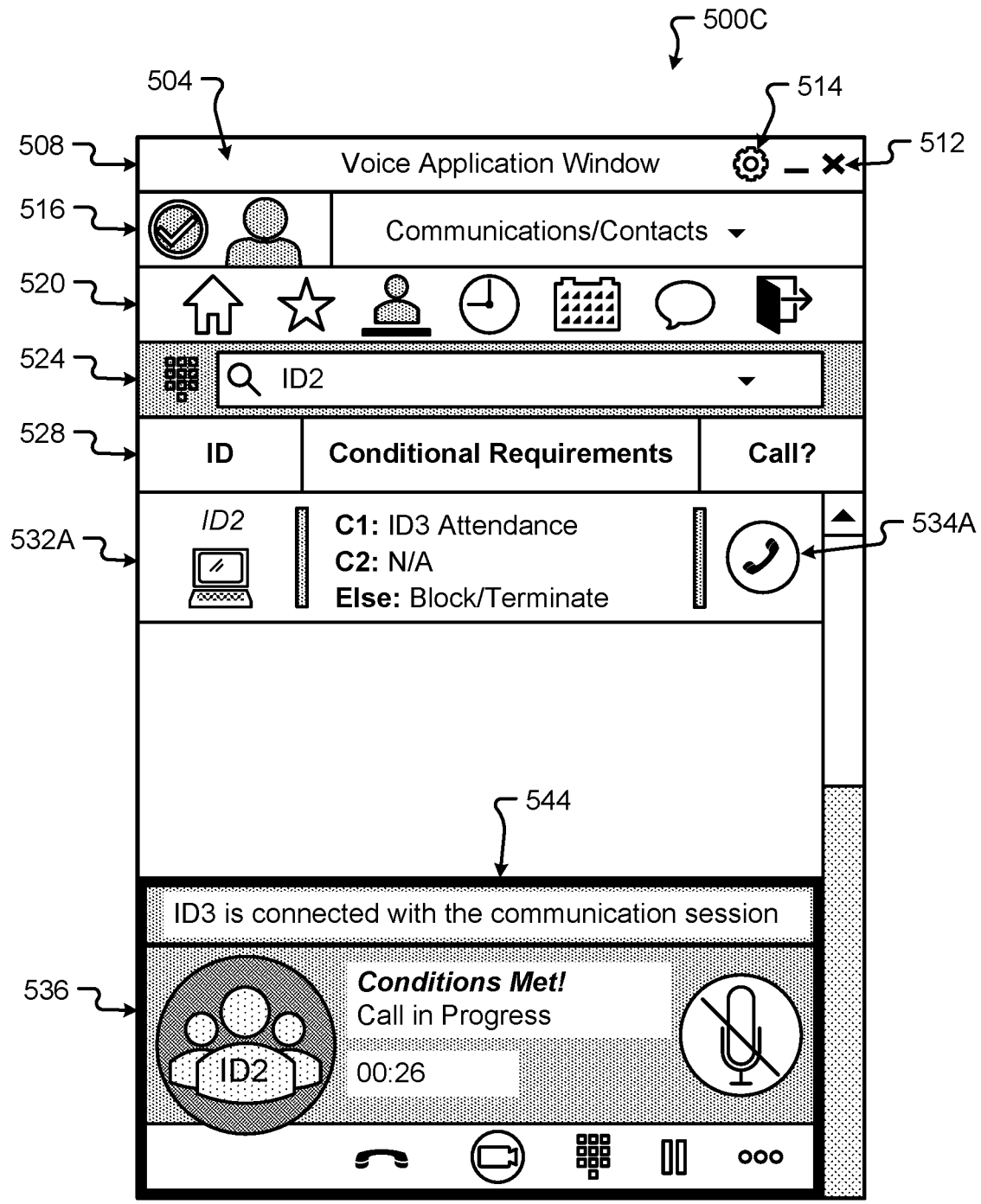
FIG. 5C is a block diagram depicting a third communication device interface presentation in accordance with embodiments of the present disclosure.

FIGS. 5A-5C show block diagrams depicting various user interfaces of a voice application 220 in accordance with embodiments of the present disclosure. The voice application window 504 can be presented to, or rendered by, a display device 216 of the communication device 108. In some embodiments, the voice application window 504 may include a number of viewing areas including, but in no way limited to, a header panel 508 including one or more window controls 512, a user context area 516, a display selection icon area 520, and a dial and search area 524. The voice application window 504 may comprise a number of contact slots 532A-532N separated from the dial and search area 524 by a contact slot header 528. The contact slot header 528 defines columns associated with the identification of a contact (e.g., the destination identification, etc.), the conditional requirements of a communication session with the selected contact, and a dial-out control selection option column allowing a user 102 of the communication device 108 to attempt to establish a communication session with a selected contact. Although shown partitioned into a discrete number of viewing areas, embodiments of the voice application window 504 are not limited to the arrangement and layout shown in FIGS. 5A-5C.

The header panel 508 may include an identification of the voice application 220 (e.g., "Voice Application Window," etc.) and the window controls 512. The window controls 512 may include icons that, when selected, minimize the window 504 (e.g., shown by the "_" symbol in the header panel 508), close the voice application window 504 (e.g., shown by the "x" symbol in the header panel 508). Additionally or alternatively, the header panel 508 may include a settings selection control icon 514. The settings selection control icon 514, when selected (e.g., by the user 102), may allow the user 102 to set preferences, change layouts, and/or otherwise configure the presentation of information rendered by the voice application window 504.

The user context area 516 may display presence status (e.g., indicated by the circular icon on the left-hand side of the user context area 516), an icon or image of the user 102, tab information, and other icons (e.g., a voicemail icon, etc.). The circular icon displaying the presence status may change from one presentation to another presentation depending on an availability of the user 102. As shown in FIGS. 5A-5C, the presence status indicated by the circular icon includes a check mark indicating that the user 102 is "available."

The display selection icon area 520 may include a number of icons that allow the user 102 to navigate between various application functions of the voice application 220. These icons may include (from left to right) a "home" icon, a "favorites" icon, a "contacts" icon, a "clock/timer" icon, a "calendar" icon, a "chat" icon, and a "logout" icon to name a few. As shown in FIGS. 5A-5C, the contact icon is shown as being underlined indicating that contact entries or slots are displayed below the dial and search area 524 of the voice application interface presentations 500A-500C.

In each voice application interface presentation 500A-500C, a number of contact slots 532A-532N are shown below the contact slot header 528. In some embodiments, each of the contact slots 532A-532N may comprise an identification, conditional requirements for establishing and maintaining a communication session with the contact, and a corresponding dial-out control selection button 534A-534N. In some embodiments, the contact slots 532A-532N may be navigated via scrolling (e.g., via the scroll bar on the right-hand side of the voice application window 504), and/or by dragging (e.g., via a touch and/or click interface input) the list of contact slots 532A-532N.

As shown in FIGS. 5A-5C, the conditional requirements for each contact slot 532A-532N provide a first condition, C1, a second condition, C2, and a restriction type "Else" action. The "Else" restriction type may correspond to the information contained in the restriction type column 416 of the conditional requirements data structure 400. This field may define what action to take when the preconditions (e.g., C1, C2, etc.) are not met. Although shown including two precondition slots for each contact slot 532A-532N, it should be appreciated that embodiments of the present disclosure may comprise more or fewer preconditions than shown.

FIG. 5B shows a second voice application interface presentation 500B when a user 102 enters the contact information or identifier (e.g., ID4) in the dial and search area 524 of the voice application window 504. Upon entering "ID4" in the dial and search area 524, the results of the contact slots 532A-532N are automatically filtered to only include entries where destination identification ID4 is found. The second voice application interface presentation 500B of FIG. 5B includes a communication session informational notification 536. The communication session informational notification 536 may provide information or detail regarding the communication session in a communication session connection information area 540.

As shown in FIG. 5B, the third dial-out control selection button 534C is greyed out (e.g., having a grey-filled background, etc.) indicating that the establishment of a communication session is unavailable. Further information regarding this lack of availability is provided in the communication session informational notification 536 presented to the lower area of the voice application window 504. In particular, the communication session informational notification 536 highlights that a communication session between the communication device 108 and the communication device 108 associated with ID4 cannot be made because the required precondition that guaranteed recording be included is "unavailable." This information is provided in the communication session connection information area 540 of the communication session informational notification 536.

In FIG. 5C, the third voice application interface presentation 500C is shown when a user 102 enters the contact information or identifier for "ID2" in the dial and search area 524 of the voice application window 504. Upon entering "ID2" in the dial and search area 524, the results of the contact slots 532A-532N are automatically filtered to only include entries where destination identification ID2 is found. The third voice application interface presentation 500C of FIG. 5C includes a communication session informational notification 536 indicating that the conditions for the communication session (e.g., ID3 in attendance) are met and the connection details area 544 of the communication session informational notification 536 informs the user 102 of the communication device 108 that a third party is connected with the communication session. In this example, as long as the conditions are met, the communication session will be allowed to exist and not be terminated.

Figure 6:
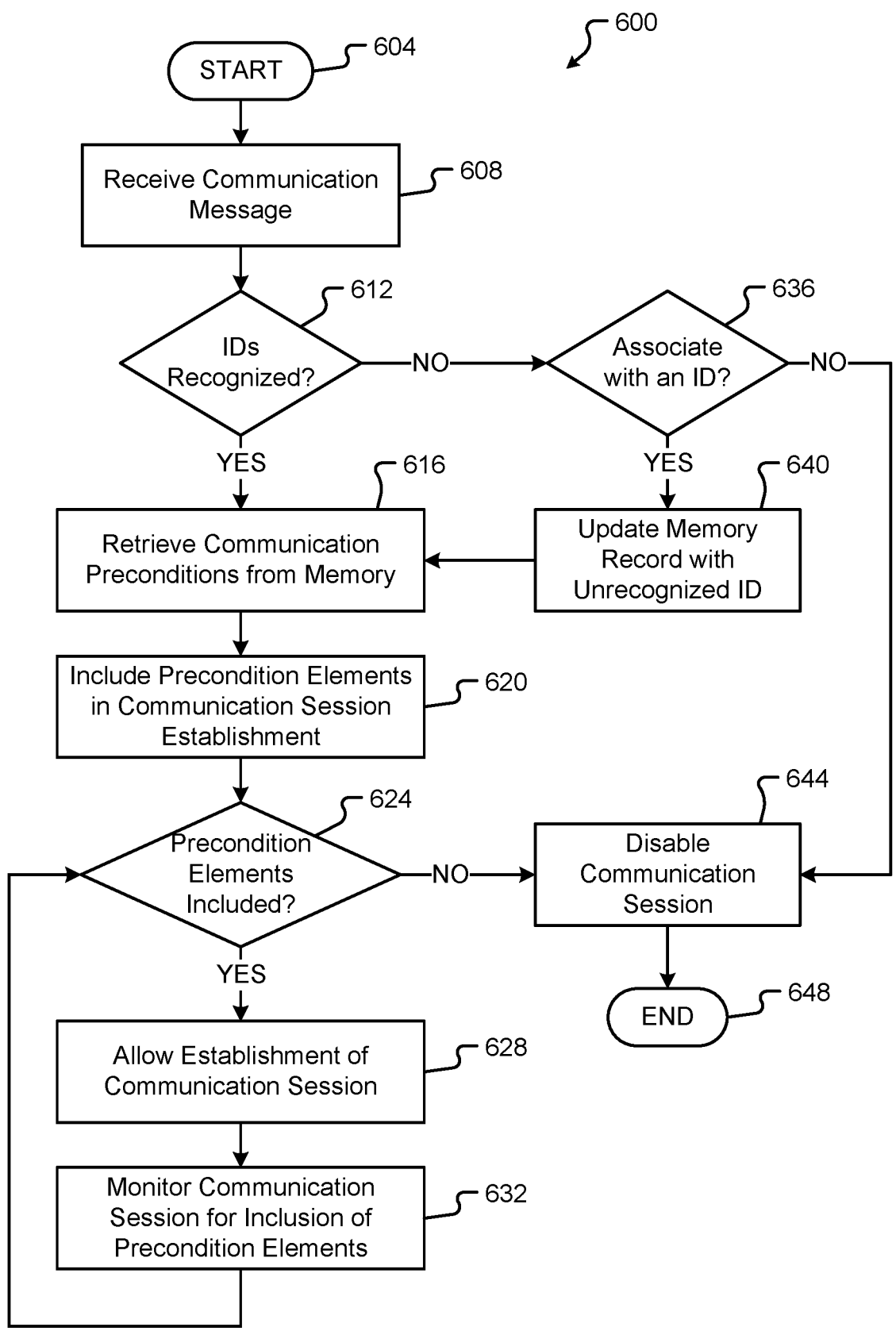
FIG. 6 is a flow diagram depicting a method of establishing and maintaining a communication session in accordance with embodiments of the present disclosure.

FIG. 6 is a flow diagram depicting a method 600 of establishing and maintaining a communication session in accordance with embodiments of the present disclosure. The method 600 can be executed as a set of computer-executable instructions (e.g., communication instructions 132, compliance instructions 136, etc.) executed by a computer system (e.g., the communication device 108, the communication server 112, etc.) and encoded or stored on a computer readable medium (e.g., the computer memory 208, the memory 128, etc.). Hereinafter, the method 600 shall be explained with reference to the systems, components, modules, applications, software, data structures, user interfaces, etc. described in conjunction with FIGS. 1-5C.

The method 600 begins at step 604 and proceeds upon receiving a communication message from at least one communication device 108 in the communication system 100 (step 608). The communication message may correspond, for example, to a call setup message from a first communication device 108A that is directed to a second communication device 108B. In one embodiment, the call setup message may comprise information found in the communication message data structure 300 described above. Among other things, the call setup message may comprise a source identification (e.g., of the communication device 108 making the call), a destination identification (e.g., of the intended recipient communication device 108 of the call), and/or other information in the communication message data structure 300.

Upon receiving the communication message, the method 600 continues by determining whether the identifications (e.g., the source identification and/or the destination identification field 312, etc.) are recognized (step 612). Recognition of these identifications may comprise referring to a conditional requirements data structure 400 or other memory location and confirming whether any entries exist corresponding to the identifications included in the communication message. If not, the method 600 proceeds to step 636.

At step 636, the method 600 may determine whether at least one of the unrecognized identifications should be associated with an existing identification. If not, the method 600 may prevent, or block, any establishment of a communication session with the unrecognized identification (step 644). However, if the unrecognized identification should be associated with an existing identification, the method 600 may proceed at step 640 by updating a memory location or record of a known identification to include the unrecognized identification. In some embodiments, this process may include associating two communication device 108 identifications with a single user 102.

Once the identifications are recognized, the method 600 may continue by retrieving communication preconditions from memory (step 616). As provided above, the communication preconditions may state that a communication session requires recording, addition of a third party, call logging, or inclusion of a specific functionality to establish and maintain the communication session. In some embodiments, the preconditions may be stored in a conditional requirements field 316 and/or a conditional requirements data structure 400. The preconditions may be based on the communication session parameters including, but in no way limited to, parties involved, content discussed, communication type, and/or the like.

The method 600 continues by including the precondition elements in establishing the communication session (step 620). In some embodiments, including the precondition elements may comprise enabling a function (e.g., call recording, call logging, etc.) for the communication session and/or joining a third party in the communication session. Joining a third party may comprise the method 600 dialing and/or connecting a third party device with the communication session.

The method 600 may determine whether the precondition elements are included in the communication session (step 624). This determination may be based on one or more signals received from the functions and/or devices included in the communication session. If at least one of the precondition elements required to establish the communication session are not included, the method 600 may proceed to step 644 and prevent, or block, any establishment of a communication session. On the other hand, when the precondition elements are determined to be included, the method 600 may allow the communication session to be established (step 628). Continuing the example above, the establishment of the communication session allows the first communication device 108A to exchange communications with the second communication device 108B as long as the preconditions are met.

It is an aspect of the present disclosure that the method 600 may continuously, or periodically, monitor the communication session to determine whether the precondition elements are included (step 632). In some embodiments, the method 600 may observe changes to the communication session as the changes happen, in real time, and determine whether the communication session is allowed to continue or whether any communications should be blocked or disabled. When at least one of the precondition elements is no longer included in the communication session, the method 600 may immediately and automatically terminate the communication session preventing any exchange of information that is not in compliance with the preconditions associated with the communication session. As such, the method 600 may return to step 624 and determine whether the precondition elements are included in the communication session. If not, the communication session is disabled at step 644. The method 600 ends at step 648.

Figure 7:
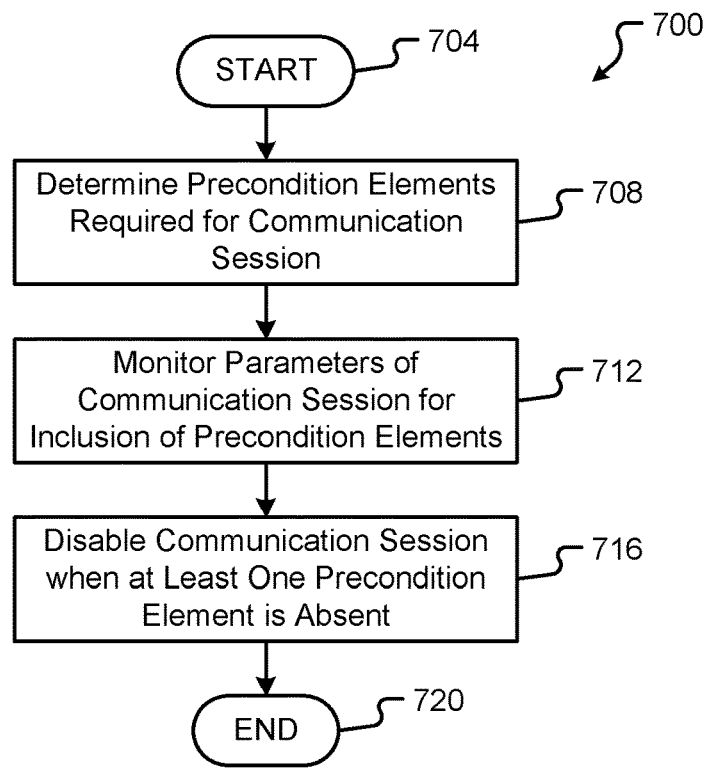
FIG. 7 is a flow diagram depicting a method of monitoring a communication session for compliance in accordance with at least some embodiments of the present disclosure.

FIG. 7 is a flow diagram depicting a method 700 of monitoring a communication session for compliance in accordance with at least some embodiments of the present disclosure. The method 700 can be executed as a set of computer-executable instructions (e.g., communication instructions 132, compliance instructions 136, etc.) executed by a computer system (e.g., the communication device 108, the communication server 112, etc.) and encoded or stored on a computer readable medium (e.g., the computer memory 208, the memory 128, etc.). Hereinafter, the method 700 shall be explained with reference to the systems, components, modules, applications, software, data structures, user interfaces, methods, etc. described in conjunction with FIGS. 1-6.

The method 700 begins at step 704 and proceeds by determining precondition elements required for a particular communication session (step 708). In some embodiments, the precondition elements required for a particular communication session may be stored as predefined condition data 140 in a conditional requirements data structure 400 or other memory (e.g., condition data memory storage device 116, memory 128, and/or computer memory 208, etc.). In one embodiment, an identification of the source and/or destination of a communication message may be used to determine corresponding preconditions stored in the conditional requirements field associated therewith.

Once determined, the method 700 may proceed by monitoring parameters of the communication session for inclusion of the precondition elements (step 712). The parameters of the communication session may comprise source identification, destination identification, conditional requirements, and/or other details associated with a communication session. In some embodiments, these details and/or parameters may be monitored periodically (e.g., every millisecond, every second, every minute, etc.), upon any change detected to the parameters, and/or in response to receiving a signal from one or more devices included as a part of the communication session.

When at least one precondition element is determined to be absent from the communication session, the method 700 may continue by disabling the communication session (step 716). Disabling the communication session may comprise terminating a communications connection between one or more parties in the communication session. For instance, in the example where the first communication device 108A is in communication with the second communication device 108B, when the precondition fails to be met (e.g., the precondition elements are absent from the communication session, etc.), any further communications between the first communication device 108A and the second communication device 108B are prevented or blocked. This disablement of the communication session may comprise terminating the communication connection and/or disconnecting from the communication channel of the communication session. In any event, the method 700 ends at step 720.

Figure 8:
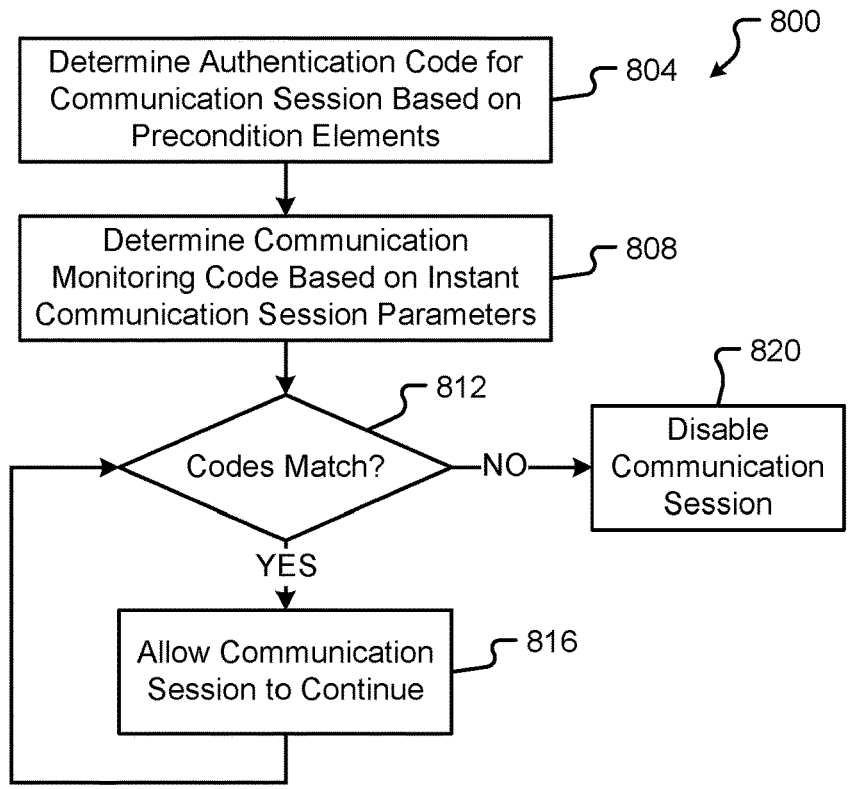
FIG. 8 is a flow diagram depicting a method of ensuring a conditional requirement is met during a communication session in accordance with embodiments of the present disclosure.

FIG. 8 is a flow diagram depicting a method 800 of ensuring a conditional requirement is met during a communication session in accordance with embodiments of the present disclosure. The method 800 can be executed as a set of computer-executable instructions (e.g., communication instructions 132, compliance instructions 136, etc.) executed by a computer system (e.g., the communication device 108, the communication server 112, etc.) and encoded or stored on a computer readable medium (e.g., the computer memory 208, the memory 128, etc.). Hereinafter, the method 800 shall be explained with reference to the systems, components, modules, applications, software, data structures, user interfaces, methods, etc. described in conjunction with FIGS. 1-7.

The method 800 begins at step 804 by determining an authentication verification code for the communication session. This authentication verification code may be based on the precondition elements associated with a particular communication session (step 808). The authentication verification code may correspond to at least one checksum, hash code, or other code that is based on the preconditions for the communication session. The authentication verification code may be algorithmically-created based on the preconditions. For instance, the information (e.g., IP addresses, identifiers, acknowledgement signals, etc.) associated with each required precondition element and communication device 108 included in a communication session may be fed, as input, to a code algorithm to generate an authentication verification code that defines when the preconditions are met as part of the communication session. Since the authentication verification code is based on the unique properties and/or parameters of the communication session including the precondition elements, the authentication verification code is unique to the communication session.

Next, the method 800 continues by determining communication session monitoring code based on instant communication session parameters (step 808). This communication session monitoring code may correspond to the heartbeat, or authentication signal, described above. The heartbeat is based on a current state of the communication session. Specifically, the heartbeat corresponds to real-time authentication information that is obtained from each required precondition element and communication device 108 included in the communication session while the communication session is in progress. This real-time authentication information may be entered as input to the code algorithm to generate the real-time heartbeat for the communication session. Any changes to the precondition elements or communication devices 108 included in the communication session change the real-time heartbeat for the communication session. As can be appreciated, the heartbeat serves to indicate a state of the communication session that may include the preconditions and allow the communication session to survive The method 800 may proceed by comparing the authentication verification code for the communication session to the real-time heartbeat for the communication session and determining whether the authentication verification code and the real-time heartbeat match (step 812). In the event that the codes do not match, the method 800 may proceed by disabling the communication session (step 820). This step may be similar, if not identical, to the disablement of the communication session described in conjunction with step 644 of FIG. 6. However, if the codes do match, the method 800 may proceed by allowing the communication session to continue (step 816). It is an aspect of the present disclosure, that the method 800 may continually check that the instant heartbeat of the communication session matches the authentication verification code generated for the communication session to ensure that the preconditions are in place for the communication session. As such, the method 800 may return to step 812 and continue to loop until a change to the parameters of the communication session require termination of communications due to an absence of precondition elements, or preconditions required for the call. In some embodiments, the method 800 may correspond to steps 624, 628, 632, and 644 of the method 600 described in conjunction with FIG. 6. In one embodiment, the method 800 may correspond to steps 708-716 of the method 700 described in conjunction with FIG. 7.

Any of the steps, functions, and operations discussed herein can be performed continuously and automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a communication method, comprising: receiving a call setup message from a first communication device that is directed toward a second communication device; determining that a communication session between the first communication device and the second communication device comprises a call requirement for an entirety of the communication session; establishing the communication session only in response to determining that the call requirement is satisfied at the time of receiving the call setup message; and monitoring the entirety of the communication session to ensure that the call requirement is met.

Aspects of the above method further comprise: disabling the communication session in response to determining that the call requirement is not met at some point during the communication session. Aspects of the above method further comprise: receiving a heartbeat signal from at least one of the first communication device and the second communication device; based on failing to receive the heartbeat signal for at least one predetermined interval of time, determining that the call requirement is not met; and disabling the communication session in response to failing to receive the heartbeat signal and determining that the call requirement is not met. Aspects of the above method include wherein the communication session is disabled by one of the first communication device and the second communication device. Aspects of the above method include wherein the communication session is disabled by at least one of a server and a network ingress device. Aspects of the above method include wherein the call requirement comprises a call recording function and wherein a device providing the call recording function sends the heartbeat signal as long as the device providing the call recording function continues to receive media packets from the communication session. Aspects of the above method include wherein the call requirement comprises including an additional communication device in the communication session and wherein the additional communication device sends the heartbeat signal as long as the additional communication device is connected with the communication session. Aspects of the above method include wherein the heartbeat signal is received on a media path used for the communication session. Aspects of the above method include wherein the heartbeat signal is received on a data path used for the communication session. Aspects of the above method include wherein the communication session comprises at least one of a voice call, a video call, a web collaboration, and a co-browsing session. Aspects of the above method include wherein the first communication device and the second communication device comprise network endpoints.

Embodiments of the present disclosure include a communication system, comprising: a processor; and computer memory storing data thereon that enables the processor to: determine that a communication session between a first communication device and a second communication device comprises a call requirement for an entirety of the communication session; monitor the entirety of the communication session to ensure that the call requirement is met; and interrupt the communication session in response to determining that the call requirement is not provided at some point during the communication session, wherein the first communication device and the second communication device are unable to exchange media while the communication session is interrupted.

Aspects of the above communication system include wherein interrupting the communication session comprises tearing down the communication session and disabling a media path between the first communication device and the second communication device. Aspects of the above communication system include wherein the call requirement comprises a call recording function. Aspects of the above communication system include wherein the processor and computer memory are provided in one of the first communication device and the second communication device. Aspects of the above communication system include wherein the processor and computer memory are provided in a server. Aspects of the above communication system include wherein the processor and computer memory are provided in a Session Border Controller ("SBC"). Aspects of the above communication system include wherein the communication session is monitored by receiving a heartbeat signal from a communication device that provides the call requirement. Aspects of the above communication system include wherein the heartbeat signal is received at predetermined intervals to indicate the call requirement is being provided during the communication session. Aspects of the above communication system include wherein the communication session comprises at least one of a voice call, a video call, a web collaboration, and a co-browsing session.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other selfcontained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A communication method, comprising:
continuously receiving a heartbeat signal from at least one of a first communication device and a second communication device;
receiving a call setup message from the first communication device that is directed toward the second communication device;
determining that a communication session between the first communication device and the second communication device comprises a call requirement for an entirety of the communication session;
establishing the communication session only in response to determining that the call requirement is satisfied and that the heartbeat signal has been received at a time of receiving the call setup message;
monitoring the entirety of the communication session to ensure that the call requirement is met, the monitoring comprising comparing an authentication code for the communication session generated based on the call requirement with the heartbeat signal; and
disabling the communication session in response to determining that the call requirement is not met during the communication session, wherein the call requirement is not met at least when the authentication code for the communication session and the heartbeat signal do not match.

2. The method of claim 1, further comprising:
based on failing to receive the heartbeat signal for at least one predetermined interval of time, determining that the call requirement is not met; and
disabling the communication session in response to failing to receive the heartbeat signal and determining that the call requirement is not met.

3. The method of claim 2, wherein the communication session is disabled by one of the first communication device and the second communication device.

4. The method of claim 2, wherein the communication session is disabled by at least one of a server and a network ingress device.

5. The method of claim 2, wherein the call requirement comprises a call recording function, and wherein a device providing the call recording function sends the heartbeat signal as long as the device providing the call recording function continues to receive media packets from the communication session.

6. The method of claim 2, wherein the call requirement comprises including an additional communication device in the communication session, and wherein the additional communication device sends the heartbeat signal as long as the additional communication device is connected with the communication session.

7. The method of claim 2, wherein the heartbeat signal is received on a media path used for the communication session.

8. The method of claim 2, wherein the heartbeat signal is received on a data path used for the communication session.

9. The method of claim 1, wherein the communication session comprises at least one of a voice call, a video call, a web collaboration, and a co-browsing session.

10. The method of claim 1, wherein the first communication device and the second communication device comprise network endpoints, and wherein the authentication code comprises at least one of a checksum and a hash code.

11. A communication system, comprising:
a processor; and
computer memory storing data thereon that enables the processor to:
- determine that an initial heartbeat signal has been received by at least one of a first communication device and a second communication device;
- determine that a communication session between the first communication device and the second communication device comprises a call requirement for an entirety of the communication session;
- monitor the entirety of the communication session to ensure that the call requirement is met, the monitoring comprising comparing an authentication code for the communication session generated based on the call requirement with a subsequent heartbeat signal; and
- interrupt the communication session in response to determining that the call requirement is not provided during the communication session, wherein the first communication device and the second communication device are unable to exchange media while the communication session is interrupted, and wherein the call requirement is not met when the authentication code for the communication session and the subsequent heartbeat signal do not match,
wherein the communication session is established only in response to the call requirement being satisfied and the initial heartbeat signal having been received at a time of a call setup message being sent from the first communication device to the second communication device.

12. The communication system of claim 11, wherein interrupting the communication session comprises tearing down the communication session and disabling a media path between the first communication device and the second communication device.

13. The communication system of claim 11, wherein the call requirement comprises a call recording function, and wherein the authentication code comprises at least one of a checksum and a hash code.

14. The communication system of claim 11, wherein the processor and computer memory are provided in one of the first communication device and the second communication device.

15. The communication system of claim 11, wherein the processor and computer memory are provided in a server.

16. The communication system of claim 11, wherein the processor and computer memory are provided in a Session Border Controller ("SBC").

17. The communication system of claim 11, wherein the communication session is monitored by receiving a second heartbeat signal from a communication device that provides the call requirement.

18. The communication system of claim 17, wherein the second heartbeat signal is received at predetermined intervals to indicate the call requirement is being provided during the communication session.

19. The communication system of claim 11, wherein the communication session comprises at least one of a voice call, a video call, a web collaboration, and a co-browsing session.

20. A communication system, comprising:
a processor; and
computer memory storing data thereon that enables the processor to:
- determine that a heartbeat signal has been received by at least one of a first communication device and a second communication device;
- determine that a communication session between the first communication device and the second communication device comprises a communication requirement for an entirety of the communication session;
- monitor parameters associated with the communication session for the entirety of the communication session to ensure that the communication requirement is met, the monitoring comprising comparing an authentication code for the communication session generated based on the communication requirement with the heartbeat signal; and
- interrupt the communication session in response to determining that the communication requirement is not provided during the communication session, wherein the interrupting includes disabling a media path between the first communication device and the second communication device and wherein the communication requirement is not met when the authentication code for the communication session and the heartbeat signal do not match,
wherein the communication session is established only in response to the communication requirement being satisfied and the heartbeat signal having been received at a time of a call setup message being sent from the first communication device to the second communication device.

* * * * *